A. E. SCHUTTE.
PAVEMENT.
APPLICATION FILED OCT. 13, 1910.

1,001,695.

Patented Aug. 29, 1911.

UNITED STATES PATENT OFFICE.

AUGUST E. SCHUTTE, OF NEWTON, MASSACHUSETTS.

PAVEMENT.

1,001,695.   Specification of Letters Patent.   Patented Aug. 29, 1911.

Application filed October 13, 1910. Serial No. 586,828.

*To all whom it may concern:*

Be it known that I, AUGUST EDUARD SCHUTTE, a citizen of the United States, residing in the city of Newton, in the county of Middlesex and State of Massachusetts, have made certain new and useful Improvements in Pavements, of which the following is a specification.

My invention relates to a pavement composed of mineral aggregate, Portland cement and bituminous cement.

The object of my invention is to produce a pavement which is rigid and self-supporting and yet which has the elasticity, resiliency and wear-resisting properties of a bituminous pavement.

In my invention I utilize the tensile strength and binding properties of Portland cement in combination with the cementing and wear-resisting properties of bituminous and similar compounds.

I am aware that pavements have been devised in which Portland cement has been used in a number of different ways. I am also aware that certain bituminous pavements have been constructed, the strength and characteristic stability of which have depended upon the mineral aggregate and others have been constructed whose strength was dependent upon the strength and consistency of the bituminous cement. I am not aware, however, of any structure in which the displacement of a single atom or particle of stone would necessitate the breaking of both the rigid bond of Portland cement and the elastic bond of a bituminous compound.

Figure 1:
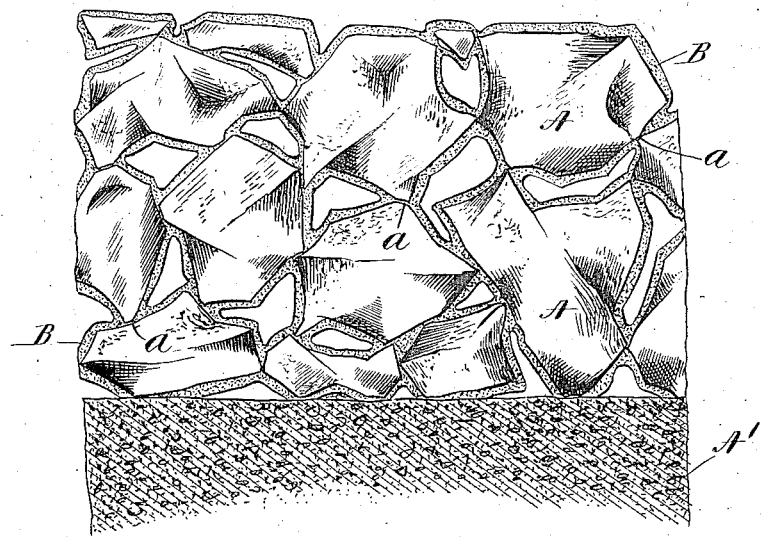
Figure 2:
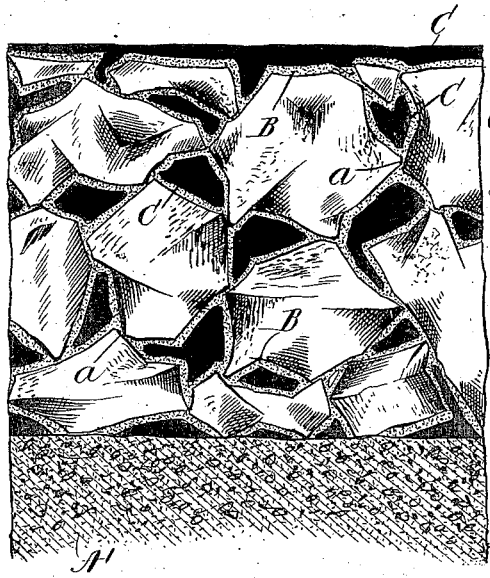
Figure 3:
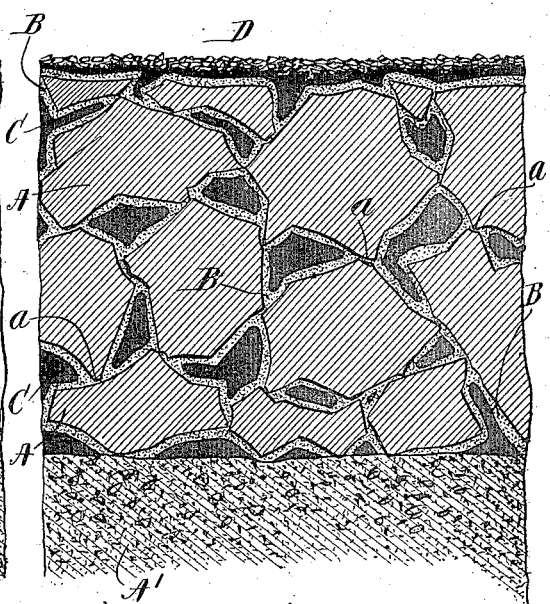

In the drawings I have shown diagrammatically two modes of using my invention. Figure 1 illustrates the pavement in vertical section in process of construction; Fig. 2 a similar section after bituminous cement has been added thereto. Fig. 3 illustrates a similar section of a pavement to which stone chips have been added.

These views are necessarily diagrammatic and illustrative only, owing to the fact that no sectional view of the face of a cutting of any pavement would show the sectional faces of the stone to be so similar in size, as in practice the stones will naturally break joints and a true section would show some of the stones cut in the middle and others cut at their ends as will readily be understood upon consideration. These views, it is believed, however, with the following description will be ample for illustrative purposes.

Referring to the drawings, A, A, A are the stones, preferably of uniform size, which are usually laid on a layer $A^1$ of Portland cement concrete. This layer is mainly for the purpose of providing a smooth and firm foundation for the pavement, but may be omitted in some cases if the soil of the natural roadbed is good and well packed.

B is a coating of pure or relatively pure Portland cement grout surrounding each individual stone A and forming a web at the point of contact where it engages the grout coating of the next adjacent stone A. The pavement is laid while the cement is wet as below described so that these cement coatings spread and coalesce where the stones touch and so form what without the stones would be a honeycomb structure while the stones as they are tamped come into actual contact through their coating of grout as at $a$.

C is the bituminous cement or like compound or a waterproof compound of an elastic nature, filling the voids and spaces between the coatings B of the stones A and forming a thin coating on top of the pavement on which, when wet, hot and soft, stone chips or sand D may be scattered if a rough surface is desired when the pavement is first used. Fig. 1 represents the pavement before the bituminous cement has been added and Fig. 2 the pavement with the bituminous filling and surfacing and before the chips are added, Fig. 3 being a similar view after the chips have been scattered on the upper surface.

In constructing my pavement I proceed as follows:—After having brought the soil to a uniform grade I lay upon the same a sheet $A^1$ of any desired thickness, preferably about four inches, of Portland cement or other concrete, say of the proportion of 1:3:6. Immediately after this is laid and while it is still wet I apply a layer of say two inches, more or less, of the material which comprises my invention, composed of relatively uniform-sized stone A coated with a relatively pure cement grout B. By relatively pure cement grout I mean neat Portland cement. A small percentage of sand may be added if thought best. These stones are coated with the cement grout either by machinery or by hand and a proportion which seems to be the best is one part of Portland cement grout to about six parts of stone by measure. This when laid on the foundation is tamped or otherwise brought to a substantially contacting relation and a level and when set forms a porous layer in which all the stones are in a contacting position supporting each other and are cemented and tied to each other by the cement grout when the grout has set. From the proportion of the grout used it can be readily seen that there will be voids and spaces adjacent to each individual coated stone and throughout the layer. (See Fig. 1). After the cement and stone structure has properly set and become hard through the hardening and crystallization of the cement (which occurs in a few days), I pour into and onto the porous and rigid structure enough bituminous compound C, asphaltic cement or the like, while hot and liquid, to fill all the voids throughout its mass and to fill the superficial voids of the structure. I usually then spread enough stone chips or sand D on the surface to render it non-slippery and suitable for vehicular traffic.

In a pavement constructed as above described the entire stress produced by the weight of the vehicle and horse is taken up by the Portland cement and stone structure while the resistance to abrasion and raveling is effected by the bituminous cement. The pavement may thus be said to be "double bonded," bonded by the grout as well as by the bituminous cement. I have found as the wear of the pavement proceeds the cement-bound stones are slowly ground away particularly at the surface while the bituminous material between the stones is spread over the same and forms a continuous and perpetual flush-coating which protects the stone, diminishes its abrasion, forms an elastic foothold for horses, and produces a smooth, dustless roadway. The double bonding effect insures long life and prevents displacement.

It is obvious that the structure above described can be laid of any thickness, but I prefer under ordinary conditions to lay it about two inches thick upon ordinary Portland cement concrete while the latter is still wet so as to unite and cement the layers together as above described. In the latter construction the bituminous cement which is poured hot into and upon the structure cannot go deeper than the smooth and voidless sub-structure $A^1$.

The advantages of my pavement as described besides its smoothness and durability are its cheapness and its simplicity of construction, it requiring no special machinery nor especially skilled labor to produce the desired results.

In using the term "bituminous cement" herein I mean any preferred form of elastic waterproof cement, whether asphaltic or otherwise, though the cement known on the market as "bituminous cement" has proved the best for the purpose. And in using the term "Portland cement" I mean to include all cements having its general characteristics.

While I have herein described my invention more particularly with reference to its use in connection with street pavements, it will be obvious that its utility is more general and that it is applicable, for example, to floorings. In the latter case, and in cases where the pavement is designed for foot traffic only, the thickness of the structure will preferably be somewhat less than when designed for vehicular traffic.

What I claim as my invention is:—

1. A pavement for foot or vehicular traffic, consisting of a layer composed of stone coated and cemented together with relatively pure Portland cement grout, the voids between the stones so coated being filled with bituminous cement.

2. A pavement for foot or vehicular traffic, comprising a mineral aggregate, the individual particles of which are bonded by a relatively pure Portland cement and the voids between which are filled with bituminous cement.

3. A pavement for foot or vehicular traffic, comprising a mineral aggregate bonded together by a rigid non-liquefiable cement, the voids between the bonded mineral particles being filled with an elastic cement.

4. A pavement for foot or vehicular traffic, comprising a mineral aggregate, a grout, and a bituminous cement, said grout coating said mineral aggregate and said bituminous cement filling the voids in the aggregate so coated.

5. A stone wearing structure for stone pavements composed of a web of stone and grout, the interstices in said web being filled with bituminous cement.

6. The pavement above described, comprising a layer of stone coated with a thin coating of grout, said grout forming a web throughout the mass, the voids in which are filled with bituminous cement, the upper surface of said pavement being composed of bituminous cement upon which mineral particles have been scattered.

7. The pavement above described, comprising a stone wearing structure composed of a web of stone and grout, the interstices in said web being filled with bituminous cement, in combination with a supporting layer of Portland cement concrete.

8. A pavement for foot or vehicular traffic, comprising a mineral aggregate the particles of which are in substantial contact and are otherwise surrounded and bonded together by a rigid non-liquefiable cement, the voids between the bonded mineral particles being filled with elastic cement.

9. That method of laying a pavement which comprises coating stone with a thin coating of grout, and laying it upon a prepared surface to a given thickness and after it is hard filling the voids and interstices with bituminous cement in a liquid condition whereby the structure will be permeated with an elastic material as described.

10. That method of laying a pavement which comprises coating stone with a thin coating of grout, and laying it upon a prepared surface to a given thickness and after it is hard filling the voids and interstices and surfacing the layer with bituminous cement in a liquid condition whereby the structure will be permeated with an elastic material as described.

11. That method of laying a pavement which comprises coating stone with a thin coating of grout, and laying it upon a prepared surface to a given thickness and after it is hard filling the voids and interstices and surfacing the layer with bituminous cement in a liquid condition whereby the structure will be permeated with an elastic material, and scattering mineral particles thereon as described.

AUGUST E. SCHUTTE.

Witnesses:
M. E. FLAHERTY,
GEORGE LANGTON.